United States Patent [19]

Briens

[11] 4,390,584

[45] Jun. 28, 1983

[54] PROCESS FOR MAKING A PERFORATED RIGID SHEET MATERIAL FOR SOUND ABSORBING COMPOSITE CELLULAR STRUCTURE

[75] Inventor: Guy Briens, Courbevoie, France

[73] Assignee: Societe Nationale Industrielle Aerospatiale, Paris, France

[21] Appl. No.: 226,932

[22] Filed: Jan. 21, 1981

[30] Foreign Application Priority Data

Apr. 18, 1980 [FR] France .................. 80 08728

[51] Int. Cl.³ .............................................. B32B 3/12
[52] U.S. Cl. .................................. 428/116; 264/45.6;
264/103; 264/257; 428/245; 428/247
[58] Field of Search ...................... 264/103, 24.5, 257,
264/324, 45.6, 45.3; 428/116, 109, 107, 113,
247, 245

[56] References Cited

U.S. PATENT DOCUMENTS

| 2,521,055 | 9/1950 | Foster ................................ 428/245 |
| 2,977,265 | 3/1961 | Forsberg et al. .................... 264/257 |
| 3,032,462 | 5/1962 | Saporito ............................. 264/257 |
| 3,341,211 | 9/1967 | Haughton et al. ................... 264/257 |
| 3,594,262 | 7/1971 | Magidson ............................ 264/257 |
| 3,649,430 | 3/1972 | Lewis et al. ........................ 428/247 |
| 3,778,334 | 12/1973 | Sturgeon ............................ 428/247 |
| 3,870,580 | 3/1975 | Belcher .............................. 264/257 |
| 3,980,511 | 9/1976 | Proucelle ........................... 264/45.3 |
| 4,020,226 | 4/1977 | Andrianov et al. .................. 264/257 |
| 4,082,882 | 4/1978 | Weinstein et al. ................... 264/257 |
| 4,090,002 | 5/1978 | Rosenblum ......................... 264/257 |
| 4,103,055 | 7/1978 | Levy ................................. 428/113 |
| 4,107,363 | 8/1978 | Dawn et al. ........................ 428/247 |
| 4,247,347 | 1/1981 | Lischer et al. ..................... 264/257 |
| 4,291,794 | 9/1981 | Bauer ............................... 264/29.4 |

FOREIGN PATENT DOCUMENTS 1294755  5/1969  Fed. Rep. of Germany ...... 428/254

*Primary Examiner*—Jay H. Woo
*Attorney, Agent, or Firm*—Merriam, Marshall & Bicknell

[57] ABSTRACT

A composite structure for absorbing sound energy, comprising an outer porous layer covering a cellular layer, wherein said porous layer is made by forming a supple loose fabric from slivers each constituted by a plurality of relatively free mineral or synthetic fibres, substantially parallel to one another and shaping said supple fabric to its final form and rendering it rigid by means of a hardenable resin, while being subjected to pressure so as to become a thin, rigid lattice, with wide crossed lines, virtually uniformly smooth on at least its face opposite said cellular layer.

8 Claims, 5 Drawing Figures

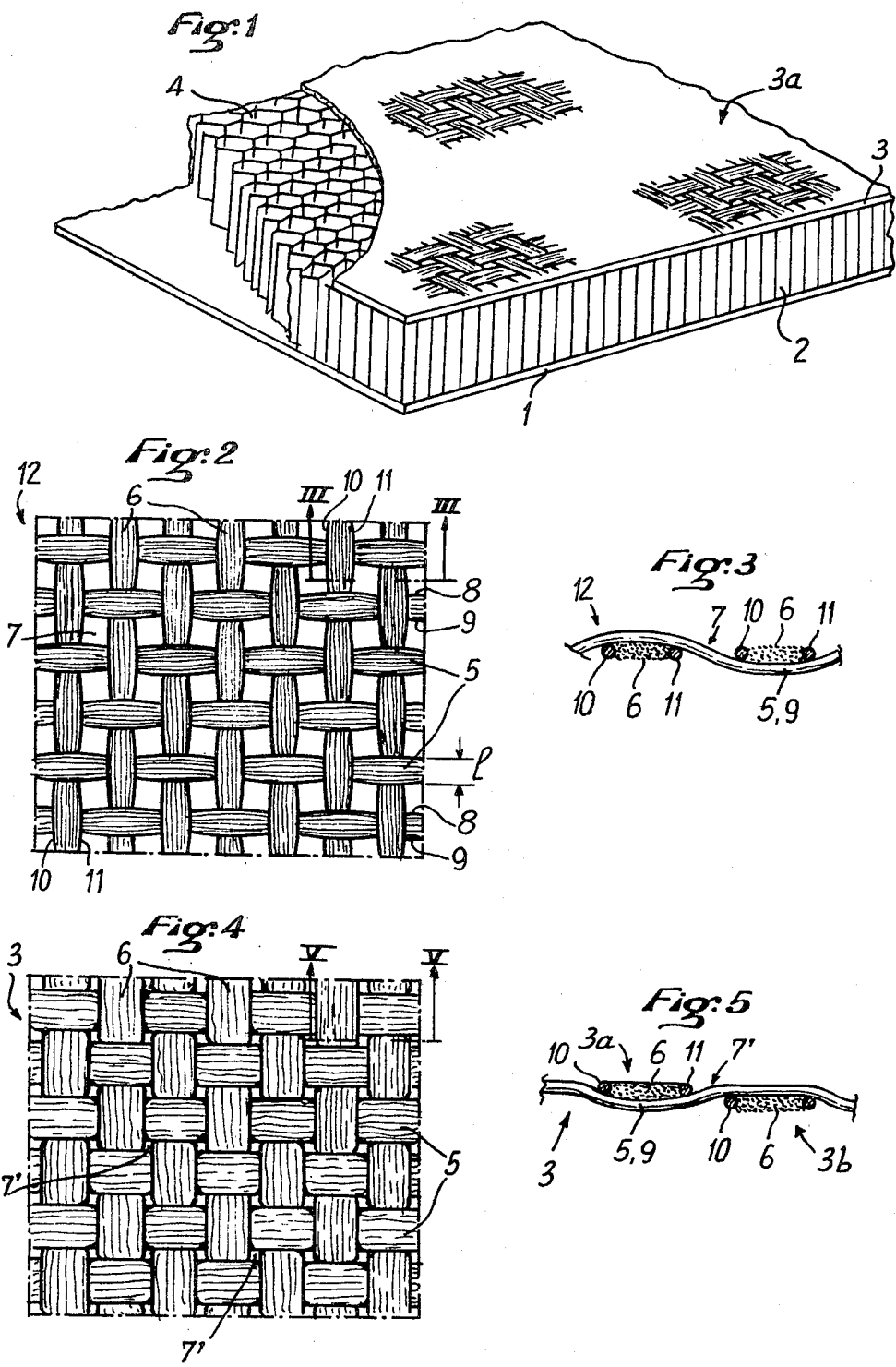

PROCESS FOR MAKING A PERFORATED RIGID SHEET MATERIAL FOR SOUND ABSORBING COMPOSITE CELLULAR STRUCTURE

The present invention relates to a composite structure for absorbing sound energy, to a porous layer for such a structure, and to the processes for manufacturing such a porous layer structure. It is particularly, although not exclusively, applicable to the absorption of sound energy in the pods of the turbo-motors of aircraft.

It is known that turbomotors, and mainly those of the double-flow type, are particularly noisy since gas flows pass therethrough at high speeds. To reduce the noise produced by these turbomotors, it has already been proposed to dispose coatings, which are capable of absorbing the sound energy of said flows at least partially, at certain spots on the pod, for example at the inlet and at the outlet of the fan duct.

Numerous types of such coatings are already known, but which present the common feature of having an identical minimal structure formed by an outer porous layer adapted to be in contact with the gaseous flows, at least one intermediate cellular layer, for example of the honeycomb type, and a rear fixing layer. Thus, the sound energy passing through the outer porous layer penetrates in the cells of the intermediate layer in which it remains imprisoned.

Such coatings, described for example in U.S. Pat. Nos. 3,493,774, 3,821,999 and 3,948,346, comprise a porous outer layer constituted by a plate, for example metallic, perforated with a plurality of calibrated openings. A porous outer layer of this type has the advantage of being smooth, and therefore of offering little resistance to the gas flows, but, on the other hand, it is heavy. For example, the weight of an outer plate of perforated aluminium for a conventional composite structure comprising a honeycomb layer composed of aluminium strip and a rear plate of aluminium cannot be less than 1600 g/m².

In other known coatings, for example those disclosed by U.S. Pat. Nos. 3,502,171 and 4,111,081, and in French Pat. No. 2 033 264 (70 02450), the porous layer is formed by a plurality of thicknesses of a glass fabric, these thicknesses being angularly shifted with respect to one another in order to adjust the porosity of the resulting layer. Such a porous layer is also relatively heavy due to the plurality of the thicknesses of glass fabrics which constitute it; moreover, its outer face is less smooth than that of the perforated metal plates. However, the greatest drawback of these known embodiments is due to the fact that the orifices for passage of the sound energy in each thickness are each constituted by the restricted space defined between two consecutive warp threads and two consecutive weft threads. Such small orifices may therefore be easily obturated by the connecting resin impregnating these fabrics. This is all the more so as the orifices of one thickness are partially covered by those of the other thicknesses. This results in that the porosity is difficult to adjust and render uniform over the whole surface of the coating. In an attempt to avoid this drawback, considerable precautions must be taken when the plurality of said thicknesses are connected and sparingly fluid resins, such as polyimides, must be used.

Furthermore, according to other known embodiments, for example by U.S. Pat. Nos. 3,481,427, 3,960,236 and 3,996,084, the whole coating is made of a fabric of glass fibres of fibres known commercially under the name of KEVLAR. These embodiments have the same drawbacks as the preceding ones as far as the porosity, the surface state and possibly the weight of the outer porous layer are concerned.

It is an object of the present invention to remedy these drawbacks of the known absorbent coatings.

To this end, according to the invention, the process for making a porous layer for composite structure intended for absorbing sound energy and comprising at least one such outer porous layer constituted by mineral and synthetic fibres and covering a cellular layer so that the sound energy passing through said porous layer is trapped in the cells of said cellular layer, is noteworthy in that a supple loose fabric is formed from slivers, each constituted by a plurality of relatively free mineral or synthetic fibres substantially parallel to one another, said supple fabric then being shaped into its final form and rendered rigid by means of a hardenable resin, whilst being subjected to pressure so as to become a thin rigid lattice with wide crossed lines, virtually uniformly smooth on at least its face opposite said cellular layer.

Thus, due to the fact that, according to the invention, slivers of fibres are used instead of using independent threads as in the prior art, it is possible to make a loose fabric of which the openings between warp and weft are perhaps less numerous but in fact larger and better defined. Consequently, these openings are virtually no longer subject to obstruction by the resin, or at least are much easier to protect from such an obstruction.

Each sliver may have, on weaving, a width of a few millimeters and a thickness of a few tenths of millimeters. The relative orientation of the warp slivers, and of the weft slivers may be any, with the result that the quadrangular openings made therebetween may take any desired shapes, such as diamonds, rectangles, etc. However, in a particularly advantageous embodiment of the fabric according to the invention, the warp and weft slivers are at right angles to one another and define square openings. These square openings made between warp slivers and weft slivers of the supple fabric may have sides whose length is of the order of size of the width of said slivers. In this particular case, the total surface of said openings therefore represents about one third of the total surface of the supple fabric.

However, as, inside each sliver, the fibres which compose it are substantially parallel and relatively free, it is obvious that, when pressure is applied, said slivers will easily be flattened, so that their width will increase and consequently the surface of the openings will reduce, the thickness of the fabric diminishing. This flattening will be a function of this pressure, so that, by adjusting said pressure, it is possible to adjust the porosity of the porous layer according to the invention.

For example, the pressure will be adjusted so that, in the rigid lattice (corresponding to the fabric with square openings mentioned hereinabove), the total surface of said openings is included between 5 and 15% of the total surface.

Thus, according to an important feature of the invention, the openings made between the warp slivers and the weft slivers of the supple fabric correspond to a porosity greater than that desired for the rigid lattice and the desired porosity for the rigid lattice is adjusted due to said pressure exerted on the supple fabric when it hardens. This desired porosity of the rigid lattice may therefore be easily adapted to the sound environment of all types of turbo-motors.

Due to the invention, not only the difficulties due to the obstructions of the openings of the porous layer are avoided, but the dimensions of said openings and the porosity of said layer may also be adjusted as desired.

Furthermore, likewise due to the relative freedom of the fibres of a sliver with respect to one another, it is possible, when pressure is applied, to obtain at least one virtually smooth face for the rigid lattice, since the slivers may then have a very small thickness, which virtually corresponds to a few diameters of the fibres which compose them.

In an advantageous embodiment intended to present considerable lightness, the slivers are constituted by carbon fibres or filaments. For example, each sliver comprises from about 1000 to 10000 carbon filaments, each of which presents a diameter of a few microns. Such slivers are available on the market under the name of TORAYCA. In such an example, the slivers of carbon filaments may present, upon weaving, a width of about 2 millimeters and square openings about 2 mm square may be made between the woven slivers. The porosity of the supple fabric is therefore of the order of 33% in this case. On the other hand, after impregnation of resin, application of pressure and hardening, the lattice may be such that the hardened flattened slivers may have an average width of the order of 3 mm, the porosity of this lattice being reduced to about 5 to 10%. This final porosity may be adjusted by adjusting the pressure, to be adapted as best possible to the desired use for the coating. The different applications in the absorption of the sound waves in the pods of turbomotors generally require porosities which vary, according to the case, from 5 to 15%.

A particularly light porous layer is thus obtained. If, in the example of coating mentioned hereinabove, the outer perforated plate is replaced by the lattice according to the invention, the weight of the porous layer is reduced from 1600 g/m$^2$ to 600 g/m$^2$.

In the case of using slivers for manufacturing the porous layer according to the invention, of which the fibres are of small diameter and/or are made of a very hard material (which is the case of carbon filaments), the supple fabric obtained by weaving risks having a low resistance and the fibres risk expanding laterally. This results on the one hand, in that the fabric is very deformable and it is therefore difficult to subject it to the consecutive operations having to ensure hardening and shaping thereof and, on the other hand, in that the openings are poorly defined, as they are partially obturated by the expanding fibres. To avoid these drawbacks, according to an important feature of the invention, more rigid border wires are associated with the slivers of fibres, when they are woven, one on each side of each sliver. Thus, expansion of the fibres is avoided and the fabric is rendered rigid. It will be noted that said wires are coupled to the slivers on the edge thereof, and are not incorporated in said slivers by helicoidal winding, so that the thickness thereof is not increased. Such border wires not only procure the advantages mentioned above upon weaving, but also serve as reinforcement for the finished rigid lattice, for example to increase mechanical strength thereof, particularly resistance to shocks. Air inlets of turbomotors are known to be subject to the shocks of hailstones, birds, etc. . . . and adequate protecting devices are generally provided. Due to the reinforcement constituted by the above-mentioned border wires, the sound energy absorbent coatings may be given a high resistance to bursting, with the result that these protecting devices may be eliminated.

In an advantageous embodiment, the border wires are constituted by metal, for example bronze, wires, so that the reinforcement constitutes a conducting grid, the warp and weft wires being in electrical contact with one another where they intersect. Thus, this reinforcement, which reinforces the weak conducting power of the carbon fibres, may, moreover, serve to evacuate the static electrical charges appearing where the coatings according to the invention are located. The latter may therefore participate in protection against lightning.

It is advantageous to use bronze wires to make the reinforcement since they are relatively inert galvanically in the presence of the carbon.

To weave the fabric according to the invention, it is advantageous to use a special shuttle for placing the border wires which is different from the shuttle intended for the slivers of fibres.

The invention will be more readily understood on reading the following description with reference to the accompanying drawings, in which:

FIG. 1 is a perspective view, with parts torn away, of a fragment of composite structure according to the invention, intended for the absorption of sound energy.

FIG. 2 is a front view of a fragment of supple fabric according to the invention.

FIG. 3 is an enlarged section along line III—III of FIG. 2.

FIG. 4 is a front view of a fragment of rigid lattice obtained by impregnation of hardenable resin, pressing and hardening of the fragment of fabric of FIG. 2.

FIG. 5 is an enlarged section along line V—V of FIG. 4.

Referring now to the drawings, the fragment of composite structure intended for absorbing sound energy and shown in FIG. 1, comprises a base layer 1, on which is fixed an intermediate cellular layer 2, itself supporting a porous layer 3.

The general configuration of such a structure is known and the present invention relates to the production and nature of the porous layer 3.

The free surface 3a of the porous layer 3 is for example in contact with a virtually tangential gas flow. The sound energy of this gaseous flow passes at least in part through said porous layer 3 and is trapped in the cells 4 of the intermediate layer 2. The latter is for example of honeycomb structure. The base layer 1, for example of aluminium strip, serves to fix the structure 1, 2, 3 on a support, for example made fast with one another by gluing.

According to the present invention, the porous layer 3 is made by weaving, coating and pressing a fabric of carbon filaments, and FIGS. 2 to 5 illustrate a preferred non-limiting embodiment of such a porous layer 3.

In the example illustrated in FIGS. 2 to 5, slivers of carbon filaments are firstly loosely woven, the weft slivers 5 and the warp slivers 6 being identical.

The slivers 5 and 6 are constituted by several thousands of carbon fibres (substantially parallel to one another and relatively free) having a diameter of a few microns and, flat, at the moment of weaving, these slivers may have a width l of the order of 2 mm. They are woven, in the example shown, so as to be at right angles to one another and to arrange therebetween square openings 7, whose sides have a length which is approximately equal to l.

Furthermore, each weft sliver 5 is bordered, on either side, by fine bronze wires 8 and 9, whilst each warp sliver 6 is bordered, on either side, by fine bronze wires 10 and 11, so that said wires are woven with the slivers 5 and 6 and each opening 7 is defined by four portions of wires 8 to 11.

A supple, loose fabric 12 is thus obtained, as illustrated in FIGS. 2 and 3.

The fabric 12 is then impregnated with a heat-setting resin, then subjected to the baking temperature thereof, whilst undergoing pressing and shaping (for example to fit the curved wall of a turbomotor pod). The rigid porous layer or lattice 3 of FIGS. 4 and 5 is then obtained. Pressing flattens the slivers 5 and 6, widening them, so that the openings 7 become smaller openings 7' having the desired dimensions for the application envisaged. Furthermore, this pressing enables a virtually smooth face 3a of the layer 3 to be obtained. To this end, it suffices to press the layer 3 between a hard surface, for example made of stainless steel, disposed towards the face 3a and a soft surface, for example made of rubber, disposed towards the opposite side 3b.

Of course, the rigid porous layer 3 is then rendered fast with the cellular layer 2 by its face 3b.

Although, in the example shown in the drawings, the slivers 5 and 6 are woven with square meshes, it is obvious that the invention is not limited to this example of weaving, which may be effected so as to form any quadrangular mesh of any desired form.

What is claimed is:

1. A process for making a light, perforated, electrically conducting rigid sheet material suitable for use as the outer surface in a sound absorbing composite cellular structure comprising the steps of:

providing a supple loosely woven fabric comprising a plurality of spaced parallel warp slivers and a plurality of spaced parallel transverse weft slivers interlaced therewith, said warp and weft slivers defining openings corresponding to a porosity greater than that desired in said rigid sheet, each of said slivers comprising a plurality of substantially straight parallel and unconnected fibers, and a pair of electrically conducting wires arranged respectively at the opposite margins of said sliver, the marginal wires in said slivers being electrically interconnected to form an electrically conducting grid;

impregnating said fabric with a hardenable resin;

applying controlled pressure to opposite faces of said impregnated fabric to create lateral expansion of said slivers sufficient to reduce the porosity to that desired in said sheet; and hardening said resin while maintaining said pressure, to produce a thin rigid electrically conducting sheet having said desired porosity.

2. The process of claim 1 wherein said pressure is applied by means which produces a substantially uniformly smooth surface on at least one face of said sheet.

3. The process of claim 1 wherein the porosity of said supple fabric is about 25-35% and the porosity of said rigid sheet is about 5-15%.

4. The process of claim 1 wherein, in said supple fabric, said warp slivers and said weft slivers are positioned at right angles to each other and define square openings whose sides have a length substantially equal to the width of said slivers.

5. The process of claim 1 wherein said fibers comprise carbon filaments.

6. The process of claim 5 wherein said warp and weft slivers in said supple fabric are about 2 mm wide and define square openings having sides about 2 mm long.

7. The process of claim 1 wherein said wires are made of bronze.

8. A perforated rigid sheet material made in accordance with the process of claim 1.

* * * * *